(12) United States Patent
Lausch et al.

(10) Patent No.: US 6,236,791 B1
(45) Date of Patent: May 22, 2001

(54) FLAME-RESISTANT OPTICAL CABLE

(75) Inventors: Peter Lausch, Krefeld; Alexander Weiss, Monchengladbach; Klaus Nothofer, Erkrath, all of (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/271,255

(22) Filed: Mar. 17, 1999

(30) Foreign Application Priority Data

Mar. 18, 1998 (DE) ................................................ 198 11 772

(51) Int. Cl.$^7$ ....................................................... G02B 6/44
(52) U.S. Cl. .......................... 385/110; 385/109; 385/113; 385/141
(58) Field of Search .................................. 385/100, 109, 385/110, 113, 141

(56) References Cited

U.S. PATENT DOCUMENTS

| | | | |
|---|---|---|---|
| 4,804,702 | * | 2/1989 | Bartoszek .............................. 524/432 |
| 4,808,476 | * | 2/1989 | Mikus et al. ........................... 428/413 |
| 5,173,960 | * | 12/1992 | Dickinson ............................ 385/100 |
| 5,644,105 | * | 7/1997 | Castellani ....................... 174/110 SR |
| 6,122,424 | * | 9/2000 | Bringuier ............................. 385/100 |

FOREIGN PATENT DOCUMENTS

| | | | |
|---|---|---|---|
| 25 13 724 A1 | 10/1976 | (DE) | ................................. 385/100 X |
| 25 13 724 B2 | 10/1976 | (DE) | ................................. 385/100 X |
| 32 36 395 A1 | 4/1984 | (DE) | ................................. 385/100 X |
| 3504041 A1 | 1/1986 | (DE) | ................................. 385/100 X |
| 1 107 796 A1 | 5/1984 | (EP) | ................................. 385/101 X |
| 0 484 744 A2 | 5/1992 | (EP) | ................................. 385/100 X |
| 0 503 469 A2 | 9/1992 | (EP) | ................................. 385/100 X |
| 2 270 995 | 3/1994 | (GB) | ................................. 385/100 X |
| 09 031 267 | 2/1997 | (JP) | ................................. 385/100 X |
| 09 033 770 | 2/1997 | (JP) | ................................. 385/100 X |

OTHER PUBLICATIONS

Wanzke, W. et al.: "Intumescent systems for polyolefins–performance profile in electrical applications" Flame Retardants 1998, Conference Proceedings, Feb. 1998, pp 195–206, XP000923331.

Gunther Mahlke et al, Lichtwellenleiterkabel der Siemens AG, 3 Aufl, 1992, S. 114,115.

Ullmann's Encyclopedia of Industrial Chemistry VCH Verlagsgesellschaft, vol. A19, 1991, S.497.

Ullman's Encyclopedia of Industrial Chemistry, VCH Verlagsgesellschaft, vol. A20, 1992, S.484.

\* cited by examiner

*Primary Examiner*—Brian Healy
(74) *Attorney, Agent, or Firm*—Sughrue, Mion, Zinn, Macpeak & Seas, PLLC

(57) ABSTRACT

An optical cable with one or more fiber optics conductors (4) that are located in a strand (1) with a polypropylene envelope or in a polypropylene support element (8), as well as with an outer jacket (6). The polypropylene contains a fire-retardant additive, the basis of which is an ammonium polyphosphate, and the jacket (6) is made of a halogen-free, flame-resistant material.

8 Claims, 1 Drawing Sheet

FLAME-RESISTANT OPTICAL CABLE

This application is based on and claims the benefit of German Patent Application No. 198 11 772.8 filed Mar. 18, 1998, which is incorporated by reference herein.

BACKGROUND OF THE INVENTION

This invention relates to an optical cable with one or more fiber optics conductors that are located in a strand with a polypropylene envelope or in a polypropylene support element, and with an outer jacket.

The prior art describes various realizations of optical cables with one or more fiber optics conductors. Generally, the fiber optics conductor or conductors are arranged in strands or support elements that protect them from mechanical damage during the manufacturing and laying of the cable. Common applications include hollow strands or tubes made of plastic that enclose one or more fiber optics conductors and are generally stranded around a central element of the cable that has a high tensile strength. Such a cable with hollow strands, which can be made of polypropylene, for example, is described in DE 25 13 724 B2. Alternatively, the fiber optics conductors of an optical cable are frequently inserted individually or in the form of ribbons in slot-shaped recesses in the surface of a support element that run approximately in the longitudinal direction ("slotted core cable"). Slotted support elements are generally made of a plastic that is generally reinforced by high tensile strength inserts made of glass fibers or steel, for example. Externally, the optical cable is preferably enclosed by an outer jacket made of polymer material.

Conventional optical cables are generally flammable on account of the polymer materials used. Even if the outer jacket is made of a non-flammable material, an additional problem in the event of a fire is that the flames are propagated by the materials of the cable core. EP 0 484 744 A2 teaches a method to improve the behavior of such a cable in the event of a fire. Hollow strands are filled with an oil-based flame-retardant compound. Even in this case, however, the mechanically solid components of the cable core are flammable. To simplify the handling of the cable, it is also desirable in many cases that the cable core should not contain any liquid filler compounds.

An extremely important consideration is the behavior of cables in the event of a fire in enclosed spaces and tunnel systems, such as in airports, railway stations or subways. Significant hazards and damage are caused by smoke particles that interfere with visibility, and by toxic gases that interfere with the escape of persons which frequently result in their death. For these reasons, when such cables are used in enclosed spaces and tunnels, not only is there a requirement that the cables be flame-retardant, but the cables must also contain no halogens and must burn with little smoke. To improve the ability of persons to escape, a low smoke density is a distinct advantage, above all during the initial stages of the fire.

SUMMARY OF THE INVENTION

Against this background, the object of the invention is to develop a flame-resistant, halogen-free fiber optics cable; in particular for enclosed spaces, in which the cable is characterized by a low smoke density in the event of a fire.

The invention teaches that the polypropylene contains a flame-retardant additive, the basis of which is an ammonium polyphosphate, and the jacket is made of a halogen-free, flame-resistant material.

The strand envelopes or support elements of the cable claimed by the invention that protect the fiber optics conductors from radial mechanical stresses are made of polypropylene, which is characterized by advantageous mechanical properties. In particular, polypropylene has a relatively high hardness and retractability. To achieve sufficient flame-resistance, the polypropylene contains a flame-retardant, the basis of which is an ammonium polyphosphate. Suitable flame-retardants, for example, include the products Hostaflam AP 750 and Hostaflam AP 751 (manufactured by Clariant, Frankfurt/Main). As a result of the effect of the ammonium polyphosphate, the plastic containing these additives foams up in the event of a fire, and the foam layer hardens. In this manner, both the feed of air to the material underneath is prevented, and the propagation of the flame is prevented by the thermal isolation action of the foam. The hardened foam also improves the chances for the continued functioning of the cable.

It is of particular advantage that no toxic gases are released in the event of a fire, and the generation of smoke, especially in the early stages of the fire, is significantly reduced. On the other hand, the advantageous mechanical characteristics of propylene are not adversely affected by the addition of ammonium polyphosphate. Therefore, hollow or buffered fibers with a single-ply envelope made of a uniform material are used, which guarantees ease of manufacture. Moreover, because the characteristics in the molten state differ only insignificantly from those of polypropylene that does not contain a flame-retardant additive, the same production tools can be used. The cable core is preferably free of liquid filler compounds.

The outer jacket of the cable is also made of a halogen-free, flame-resistant material, to achieve sufficient resistance to fire. The outer jacket is appropriately made of a polyolefin with a flame-retardant additive, for which polypropylene with a flame-retardant agent based on ammonium polyphosphate is also suitable. The jacket material can thereby also contain additional conventional additives. In that case, it is advantageous if the plastic components of the cable are made of uniform material. The chances of the cable continuing to perform its function in the event of a fire are also improved.

It is conceivable that a support element has essentially longitudinal, preferably spiral, recesses in which fiber optics conductors run. In other words, the cable is a slotted core cable. The support element consists of polypropylene with a fire-retardant additive based on ammonium polyphosphate. If the support element is the central element of the cable, it preferably has high tensile strength reinforcements, for example made of glass-fiber reinforced plastic or steel. This configuration is particularly appropriate if the fiber optics conductors are combined in groups into ribbons.

A hollow or multi-fiber buffer tube can be appropriately stranded around a central element. Likewise, a support element can be stranded around a central element. The central element preferably has a high tensile strength and comprises, for example, fiber reinforcements such as glass or aramid fibers. In addition to the high tensile strength components, the central element preferably also consists of a halogen-free, flame-resistant polymer, in particular polypropylene with the addition of ammonium polyphosphate. Alternatively, a strand with one or more fiber optics conductors can be located in the center of the optical cable, whereby the cable may comprise only one strand (unitube cable).

The core of the cable can be appropriately provided with a wrapping, for example, a plastic film. The core can also be wrapped with a glass fabric or mica ribbon.

BRIEF DESCRIPTION OF THE DRAWING

Advantageous embodiments of the invention are described by way of example in the following portion of the description, with reference to the schematic diagrams presented in the accompanying drawings, which show: In the drawings.

DETAILED DESCRIPTION OF THE INVENTION

Figure 1:
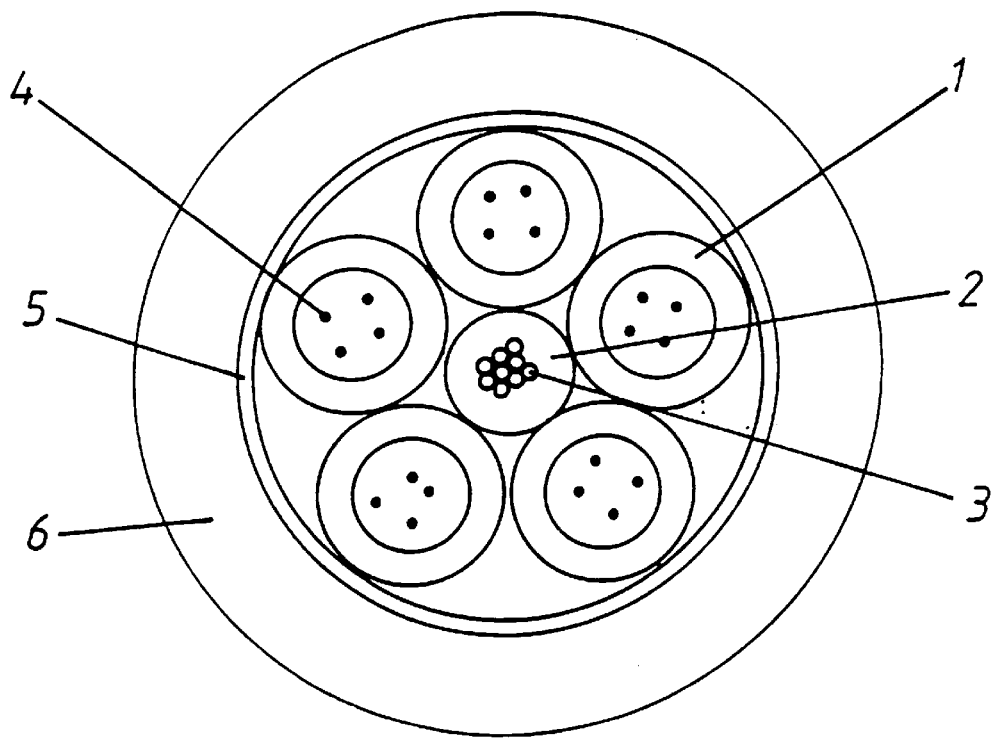
FIG. 1 is a cross section through an optical cable with multi-fiber buffer tubes.

The optical cable illustrated in FIG. 1 comprises a plurality of strands (1), which in the example are multi-fiber buffer tubes that are stranded around a central element (2). The central element (2) consists of high tensile strength members (3) that are embedded in a polymer material. The strands (1), which protect the fiber optics conductors (4) of the cable from mechanical damage, are made of polypropylene to which ammonium polyphosphate has been added. The polymer of the central element (2) that surrounds the members (3) advantageously consists of a halogen-free, flame-resistant material, preferably also polypropylene with ammonium polyphosphate.

The core of the optical cable is provided with a wrapping (5), such as a glass fabric or mica ribbon, over which the external jacket (6) of the cable is applied. The material of the jacket is halogen-free and flame-resistant. It preferably consists of a polymer based on polypropylene, which contains ammonium polyphosphate as a flame-retardant and other additives if necessary.

Figure 2:
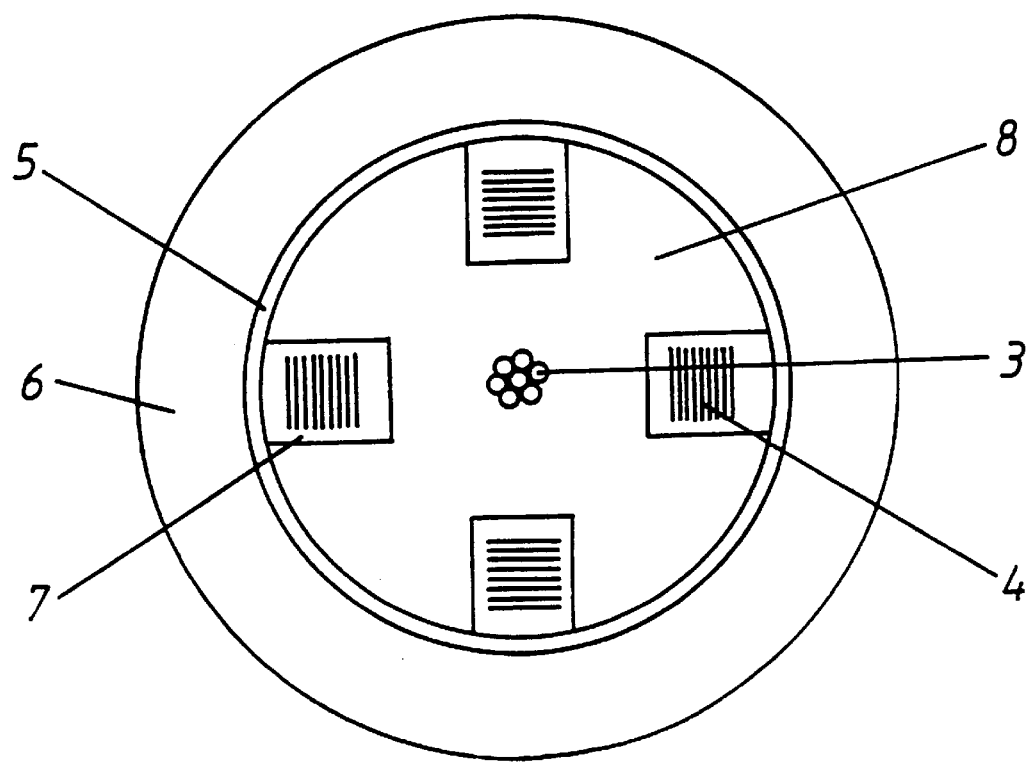
FIG. 2 is a cross section through a slotted core cable.

FIG. 2 shows a flame-resistant slotted core cable in which the fiber optics conductors (4) are combined into ribbons and run in recesses (7) that extend in a spiral shape in the longitudinal direction of the support element (8). The support element (8) has high-tensile strength members (3) and consists of polypropylene to which ammonium polyphosphate has been added. On the outside, the cable core is surrounded by a wrapping (5) and a jacket (6) that are configured in a manner that is analogous to the example described above.

The invention teaches that, in this manner, it is possible to produce halogen-free optical cables that are characterized in particular in the initial phase of the fire by the generation of a small amount of smoke and continue to function for a longer period of time.

What is claimed is:

1. An optical cable with one or more fiber optic conductors (4) that are located in a tube-like strand (1) made of polypropylene or in a support element (8) made of polypropylene, as well as with an external jacket (6), wherein:

a fire retardant based on an ammonium polyphosphate is added to the polypropylene, and the jacket (6) consists of a halogen-free, flame resistant material.

2. The cable as claimed in claim 1, wherein the outer jacket (6) is made of polypropylene with a fire-retarding additive on the basis of ammonium polyphosphate.

3. An optical cable with one or more fiber optics conductors that are located in a strand with an envelope made of polypropylene or in a support element made of polypropylene, and an external jacket wherein:

the polypropylene contains a fire retardant additive that is based on an ammonium polyphosphate, and the jacket consists of a halogen-free, flame resistant material; and wherein the support element (8) has slot-shaped recesses (7) in which the fiber optic conductors run.

4. The cable as claimed in claim 1, wherein the strand (1) or the support element (8) is stranded around a central element (2) of the cable.

5. The cable as claimed in claim 1, further comprising a central element (2) that is another strand or another support element.

6. The cable as claimed in claim 1, further comprising a central element (2) that is made of polypropylene with a fire retarding additive on the basis of ammonium polyphosphate.

7. An optical cable with one or more fiber optics conductors that are located in a strand with an envelope made of polypropylene or in a support element made of polypropylene and an external jacket wherein:

the polypropylene contains a fire retardant additive that is based on an ammonium polyphosphate, and the jacket consists of a halogen-free, flame resistant material; and wherein the cable further comprises a central element (2) with inserts that have high tensile strength.

8. The cable as claimed in claim 1, further comprising a cable core that is provided with a wrapping (5).

* * * * *